United States Patent
Ko

(10) Patent No.: US 12,304,428 B2
(45) Date of Patent: May 20, 2025

(54) METHOD, APPARATUS, AND NON-TRANSITORY COMPUTER READABLE MEDIUM FOR LOCKING AUTOMOBILE

(71) Applicant: FOXCONN INTERCONNECT TECHNOLOGY LIMITED, Grand Cayman (KY)

(72) Inventor: Chung-Nan Ko, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 504 days.

(21) Appl. No.: 17/704,308

(22) Filed: Mar. 25, 2022

(65) Prior Publication Data

US 2023/0011534 A1 Jan. 12, 2023

(30) Foreign Application Priority Data

Jul. 8, 2021 (CN) .......................... 202110772797.7

(51) Int. Cl.
| | | |
|---|---|---|
| *B60R 25/34* | (2013.01) | |
| *B60R 25/04* | (2013.01) | |
| *B60R 25/10* | (2013.01) | |
| *B60R 25/22* | (2013.01) | |
| *B60R 25/31* | (2013.01) | |
| *G08B 7/06* | (2006.01) | |

(52) U.S. Cl.
CPC .............. *B60R 25/34* (2013.01); *B60R 25/04* (2013.01); *B60R 25/1003* (2013.01); *B60R 25/22* (2013.01); *B60R 25/31* (2013.01); *G08B 7/06* (2013.01)

(58) Field of Classification Search
CPC ..... B60R 25/34; B60R 25/04; B60R 25/1003; B60R 25/22; B60R 25/31; B60R 25/01; B60R 25/10; B60R 2025/1013; G08B 7/06
See application file for complete search history.

(56) References Cited

U.S. PATENT DOCUMENTS

| | | | | |
|---|---|---|---|---|
| 2004/0094974 A1* | 5/2004 | Song | ........................ | E05B 85/12 |
| | | | | 292/336.3 |
| 2015/0226146 A1* | 8/2015 | Elwart | ................ | F02N 11/0818 |
| | | | | 701/112 |
| 2021/0291764 A1* | 9/2021 | Koda | ...................... | B60R 25/31 |

FOREIGN PATENT DOCUMENTS

| | | | | | |
|---|---|---|---|---|---|
| CN | 202623944 U | * | 12/2012 | | |
| DE | 10300669 B4 | * | 3/2015 | ............. | B60K 28/02 |
| JP | 2023119923 A | * | 8/2023 | ............. | G01V 11/00 |

OTHER PUBLICATIONS

English translation of DE-10300669-B4 (Year: 2015).*
English translation of CN 202623944 U (Year: 2012).*

* cited by examiner

*Primary Examiner* — Brian P Sweeney
(74) *Attorney, Agent, or Firm* — ScienBiziP, P.C.

(57) ABSTRACT

A method for locking automobile includes determines if a door locking action is done by a driver. If the automobile is found to be in a status of parking and an engine system is not turned off, a sensor can detect presence of absence of passengers in the automobile. The location of a key being found outside of the automobile or still inside according to wireless communication signals from the key allows the engine system to be shut down and the door lock to be locked, thereby locking and securing the automobile, otherwise the driver is warned that his door locking action is ineffective and his action to apply locking is rejected. An (Continued)

apparatus and a non-transitory computer readable medium for locking automobile are also disclosed.

9 Claims, 2 Drawing Sheets ions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.
METHOD, APPARATUS, AND NON-TRANSITORY COMPUTER READABLE MEDIUM FOR LOCKING AUTOMOBILE

CROSS-REFERENCE TO RELATED APPLICATIONS

This application claims priority to Chinese Patent Application No. 202110772797.7 filed on Jul. 8, 2021, filed in China National Intellectual Property Administration, the contents of which are incorporated by reference herein.

FIELD

The subject matter herein generally relates to vehicle security, and particularly to a method, an apparatus, and a non-transitory computer readable medium for locking an automobile.

BACKGROUND

New non-traditional automobiles, such as electric mobiles and/or hybrid electric mobiles, provide a different driving experience compared to traditional automobiles. Since the electric motor is running in low speed or braked, there is less vibration of the electric motor than in combustion motors, which is quieter and provides different experiences to the passengers in cars. However, when the electric vehicles are to be parked, the driver may leave the car before hearing the engine has stopped. In such a situation, a door of the vehicle may not be locked. Then, the driver needs to get in the car again to shut down his electric vehicle, this may be inconvenient for the driver.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to provide a clear understanding of the objects, features, and advantages of the present disclosure, the same are given with reference to the drawings and specific embodiments. It should be noted that non-conflicting embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art as generally understood. The terms used in the present disclosure are for the purposes of describing particular embodiments and are not intended to limit the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Figure 1:
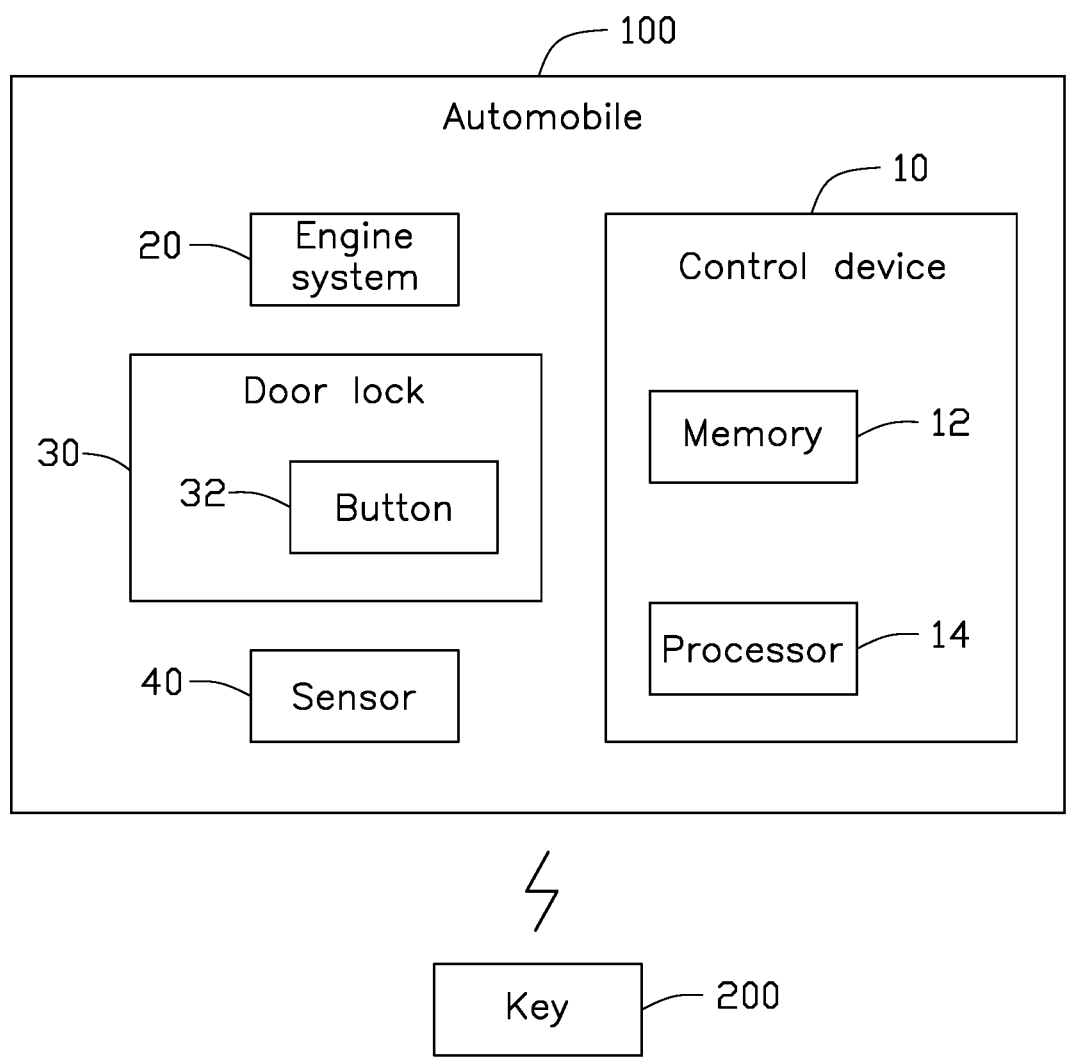
FIG. 1 shows at least one embodiment of a schematic structural diagram of a system for locking an automobile of the present disclosure.

Furthermore, the term "module", as used herein, refers to logic embodied in hardware or firmware, or to a collection of software instructions, written in a programming language, such as Java, C, or assembly. One or more software instruct FIG. 1 illustrates at least one embodiment of a schematic structural diagram of a system for locking automobile of the present disclosure. The system includes an automobile 100 and a key 200. The automobile 100 at least includes a control device 10, an engine system 20, a door lock 30, and a sensor 40. It should be understood by the person with skills in the art, the schematic structural diagram is an embodiment of the automobile 100, which is not limiting the automobile 100, another automobile 100 may include more or less portions, elements, components, and/or assembly than that as shown in the figure, which may form a complete automobile system to achieve steer functions.

The control device 10 at least includes a memory 12 and a processor 14.

The memory 12 stores instructions in the form of one or more computer-readable programs that can be stored in the non-transitory computer-readable medium (e.g., the storage device of the apparatus), and executed by the at least one processor of the apparatus to implement the method for locking automobile, and control the engine system 20, the door lock 30, the sensor 40, and every part of the automobile 100.

In at least one embodiment, the memory 12 can be used to store program codes of computer readable programs and various data. The memory 12 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM), a compact disc read-only memory (CD-ROM), or other optical disk storage, magnetic disk storage, magnetic tape storage, or any other storage medium readable by the automobile 100.

In at least one embodiment, the processor 14 may be a central processing unit (CPU), and may also include other general-purpose processors, digital signal processors (DSPs), application specific integrated circuits (ASICs), and off-the-shelf programmable gate arrays, Field-Programmable Gate Array (FPGA) or other programmable logic device, discrete gate, or transistor logic device, discrete hardware components, etc. The general-purpose processor may be a microprocessor or the processor may be any conventional processor or the like. The processor 14 is control center of the automobile 100, and connects sections of the entire automobile 100 with various interfaces and lines.

In at least one embodiment, the control device 10 may further include a user interaction equipment having input and display functions. The user interaction equipment provides a user interface for inputting data by a user. The control device 10 may also output data through the user interface.

The engine system 20 is configured to provide power for the automobile 100, which including status of startup, running, and turned-off. According to the status of the engine system 20, the automobile 100 may be in status of steering, parking, inactivated, correspondingly.

The door lock 30 is mounted to doors of the automobile 100 and configured to open or lock the doors. In at least one embodiment, the door lock 30 further includes a button 32 configured to be pressed by the user for locking the doors. In at least one embodiment, the button 32 may be mounted to door handles of the doors for being pressed by the user.

The sensor 40 may be a pressure sensor mounted to seats of the automobile 100 and configured to indicate a passenger or no passenger on the seat.

The key 200 is a wireless key and in wireless communication with the automobile 100. The key 200 is configured to open and lock the door lock 30. In at least one embodiment, the key 200 may include a wireless communication module and an antenna for establishing wireless communication with the control device 10 and transmitting wireless communication signals to the control device 10 for positioning the key 200.

Figure 2:
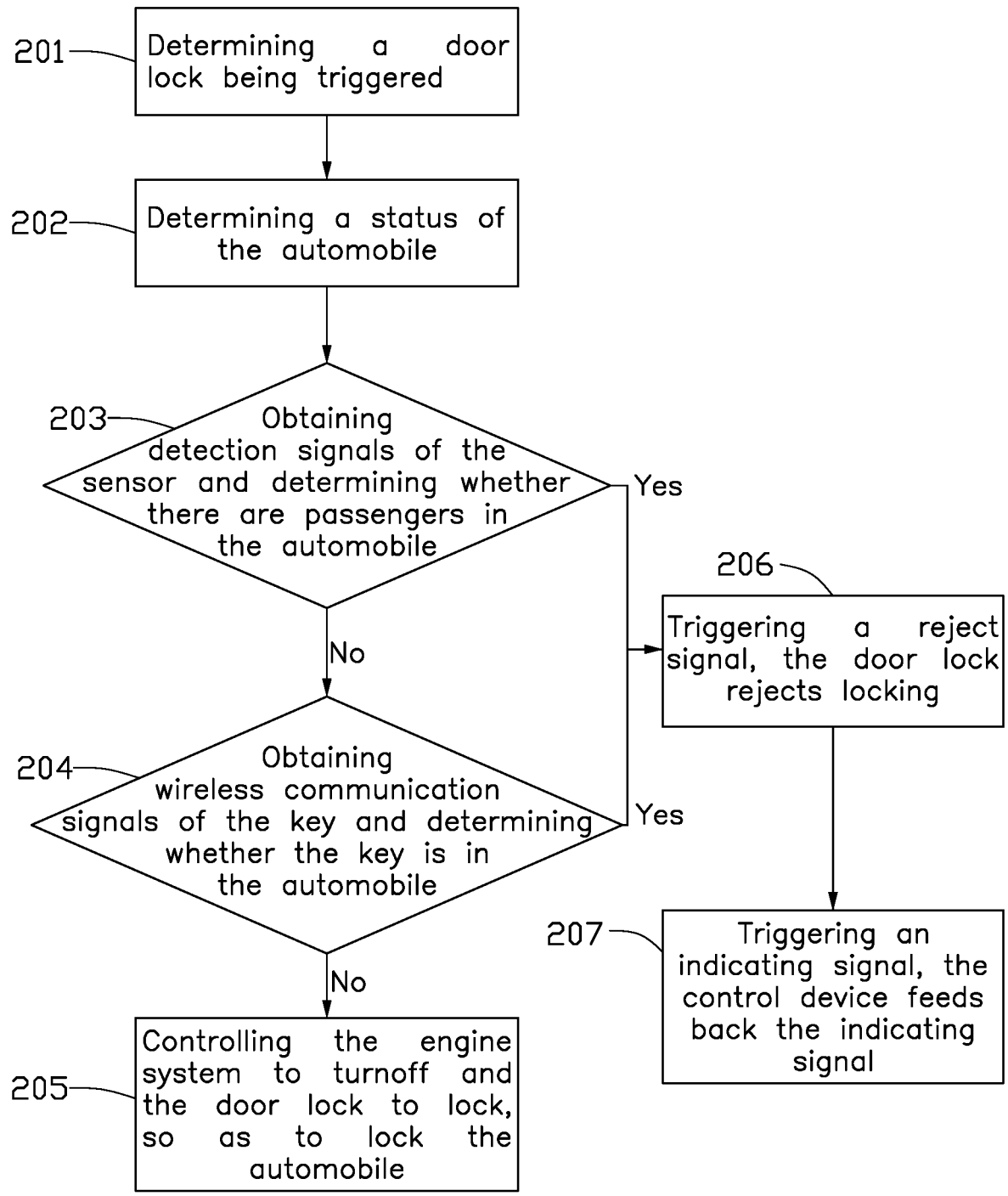
FIG. 2 is a flowchart of at least one embodiment of a method for locking an automobile of the present disclosure.

Referring to FIG. 2, the method is provided by way of example, as there are a variety of ways to carry out the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block 201.

At block 201, obtaining a signal of the door lock 20 being locked (triggered).

In at least one embodiment, when the button 32 detects is pressed by the user, the control device 10 obtains a trigger signal of the door lock 30. In at least one embodiment, when the button 32 detects being pressed, it is determining that the user is pressing the button 32 on the door handle and trying to open or lock the door.

At block 202, obtaining a status of the automobile 100.

In at least one embodiment, the control device 10 obtains a running status of the engine system 20 to obtain the status of the automobile 100. When the automobile 100 is in a status of parking without deactivation, that is, when the automobile 100 is not being steered and the engine system 20 is not turned-off, the method of the present disclosure is carried out.

In at least one embodiment, when the automobile 100 is an electric mobile and/or a hybrid electric mobile, and when the automobile 100 is in a status of parking without deactivation, there is small or no vibration or noise of the automobile 100, which may provide quiet feelings to the passengers.

At block 203, obtaining detection signals of the sensor 40 and determining whether there are passengers in the automobile 100.

In at least one embodiment, the sensor 40 detects pressures on the seats in the automobile 100 and determines whether there are passengers in the automobile 100. In at least one embodiment, there are a plurality of seats in the automobile 100, each seat has one corresponding sensor 40.

In the block 203, when there is no passenger within the automobile 100, the procedure goes to block 204; when there is passenger(s) seated in the automobile 100, the procedure goes to block 206.

At block 204, obtaining wireless communication signals of the key 200 and determining whether the key 200 is in the automobile 100.

In at least one embodiment, the control device 10 obtains wireless communication signals of the key 200, and can locate the key 200, to further determine if the key 200 is within the automobile 100 or outside of the automobile 100.

In the block 204, when the key 200 being outside of the automobile 100 is determined, the procedure goes to block 205; when the key 200 being within the automobile 100 is determined, the procedure goes to block 206.

At block 205, controlling the engine system 20 to turn off and the door lock 20 to lock, so as to lock and secure the automobile 100.

In at least one embodiment, the control device 10 turns of the engine system 20 and the door lock 20 to lock, so the automobile 100 is locked. In addition, the control device 10 may shut down the power by shutting down lights of the automobile 100.

In at least one embodiment, when the automobile 100 is locked and secured, the key 200 is needed for unlocking and starting up, which may improve a security of the automobile 100.

At block 206, triggering a reject signal, the door lock 30 rejects a locking action.

In at least one embodiment, the door lock 30 may feed back the reject signal through the button 32. The reject signal may be, but not limited to, vibration, for indicating situation to the user.

At block 207, triggering an indicating signal, the control device 10 feeds back the indicating signal.

In at least one embodiment, the control device 10 may display graphical indicating messages and play audio message through a graphical user interface, so as to indicate to the user in a visual and an audible way.

A non-transitory computer-readable storage medium including program instructions for causing the apparatus to perform the method for locking automobile is also disclosed.

When the automobile 100 is an electric mobile and/or a hybrid electric mobile, and when the automobile 100 is in a status of parking without being deactivated, there is small or no vibration of the automobile 100. When the driver forgets to shut down the engine system 20, leaves the automobile 100, and tries to lock the door lock 30 through the button 32 on the handle, the method determines there is no passenger in the automobile 100 and the key 200 is outside of the automobile 100, so as to control the engine system 20 to shut down and lock the door lock 30, so the driver does not need to get back into the automobile 100, which is convenient for the user and improves a security of the automobile 100.

The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM, Random Access Memory), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A method of locking automobile, the automobile comprises a door lock, an engine system, and a sensor, the door lock comprises a button mounted to door handles of doors of the automobile, the automobile is in wireless communication with a key, the method comprising:
    determining if the door lock is triggered, wherein when the button detects being pressed, determining that the door lock is triggered;
    determining if the automobile is in a status of parking and the engine system is not deactivated;
    confirming by the sensor that no passenger is in the automobile;
    determining if the key is outside of the automobile according to wireless communication signals of the key; and
    controlling the engine system to shut down and locking the door lock, thereby locking the automobile;
    determining by the sensor that there are passengers in the automobile, or determining that the key is within the automobile according to the wireless communication signals of the key;
    triggering a reject signal, the door lock rejecting to lock, wherein the reject signal is a vibration signal on the door handles.

2. The method according to claim 1, further comprising:
    displaying graphical indicating messages and playing audio indicating messages through a graphical user interface.

3. The method according to claim 1, further comprising:
    displaying graphical indicating messages and playing audio indicating messages through a graphical user interface.

4. The method according to claim 1, wherein the obtaining the sensor detecting no passenger in the automobile comprises:
    obtaining a pressure detecting signal from seats in the automobile and determining whether there is passenger in the automobile.

5. An apparatus for locking automobile, the automobile comprises a door lock, an engine system, and a sensor, the door lock comprises a button mounted to door handles of doors of the automobile, the automobile is in wireless communication with a key, the apparatus comprising:
    a memory;
    at least one processor; and
    the memory storing one or more programs that, when executed by the at least one processor, cause the at least one processor to perform:
    determining if the door lock is triggered, wherein when the button detects being pressed, determining that the door lock is triggered;
    determining if the automobile is in a status of parking and the engine system is not deactivated;
    confirming by the sensor that no passenger is in the automobile;
    determining if the key is outside of the automobile according to wireless communication signals of the key; and
    controlling the engine system to shut down and locking the door lock, thereby locking the automobile;
    determining by the sensor that there are passengers in the automobile, or determining that the key is within the automobile according to the wireless communication signals of the key;
    triggering a reject signal, the door lock rejecting to lock, wherein the reject signal is a vibration signal on the door handles.

6. The apparatus according to claim 5, wherein the memory storing one or more programs that, when executed by the at least one processor, cause the at least one processor to perform:
    displaying graphical indicating messages and playing audio indicating messages through a graphical user interface.

7. The apparatus according to claim 5, wherein the memory storing one or more programs that, when executed by the at least one processor, cause the at least one processor to perform:
    displaying graphical indicating messages and playing audio indicating messages through a graphical user interface.

8. The apparatus according to claim 5, wherein the obtaining the sensor detecting no passengers in the automobile comprises:
    obtaining a pressure detecting signal from seats in the automobile and determining whether there is passenger in the automobile.

9. A non-transitory storage medium having stored thereon instructions that, when executed by a processor of an apparatus, causes the processor to perform a method for locking automobile, the automobile comprises a door lock, an engine system, and a sensor, the door lock comprises a button mounted to door handles of doors of the automobile, the method comprising:
    determining if the door lock being triggered, wherein when the button detects being pressed, determining that the door lock is triggered;
    determining if the automobile being in a status of parking and the engine system being not deactivation;
    confirming by the sensor that no passenger in the automobile;
    determining if the key is outside of the automobile according to wireless communication signals of the key; and
    controlling the engine system to shut down and locking the door lock, thereby locking the automobile;
    determining by the sensor that there are passengers in the automobile, or determining that the key is within the automobile according to the wireless communication signals of the key;

triggering a reject signal, the door lock rejecting to lock, wherein the reject signal is a vibration signal on the door handles.

\* \* \* \* \*